(12) United States Patent
Kim et al.

(10) Patent No.: US 11,359,789 B2
(45) Date of Patent: Jun. 14, 2022

(54) VEHICLE LAMP WITH DEHUMIDIFICATION

(71) Applicant: Daegu Gyeongbuk Institute of Science and Technology, Daegu (KR)

(72) Inventors: Dong Hwan Kim, Daegu (KR); Jeongmin Kim, Daegu (KR); Tae Young Yun, Daegu (KR); Jong Tae Kim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 17/167,321

(22) Filed: Feb. 4, 2021

(65) Prior Publication Data

US 2021/0270442 A1    Sep. 2, 2021

(30) Foreign Application Priority Data

Feb. 27, 2020   (KR) .......................... 10-2020-0024536
Aug. 27, 2020   (KR) .......................... 10-2020-0108651

(51) Int. Cl.
*F21S 45/30* (2018.01)
*F21S 45/60* (2018.01)
(Continued)

(52) U.S. Cl.
CPC ............ *F21S 45/30* (2018.01); *B60Q 1/0005* (2013.01); *B60Q 1/0023* (2013.01);
(Continued)

(58) Field of Classification Search
None
See application file for complete search history.

(56) References Cited

U.S. PATENT DOCUMENTS 10,330,278 B2    6/2019   Kim et al.
2017/0343182 A1*  11/2017   Chiron .................. F21S 41/255

FOREIGN PATENT DOCUMENTS

CN    112097220    * 12/2020
JP    2009021245    1/2009
(Continued)

OTHER PUBLICATIONS

KIPO, Office Action of KR 10-2020-0024536 dated May 8, 2020.
KIPO, Notice of Allowance of KR 10-2020-0108651 dated Oct. 16, 2020.

*Primary Examiner* — Ashok Patel
(74) *Attorney, Agent, or Firm* — Lex IP Meister, PLLC (57) ABSTRACT

A vehicle lamp including a light source, a glass disposed in front of the light source, a housing supporting the light source and the glass, and a thermoelectric element unit generating cold wind and hot wind. The thermoelectric element unit includes a first part connected to the first flow path and generating one of cold air and hot air, a second part connected to the second flow path and generating the other one of the cold air and the hot air, a body accommodating the first part and the second part and having an opening formed on an upper surface, and a fan configured to be disposed on the opening of the body and introduce the air in a direction from the upper surface to a lower surface of the body. The thermoelectric element unit is positioned on an upper end of an external rear surface of the housing.

12 Claims, 9 Drawing Sheets

(51) Int. Cl.
  *F21S 45/435* (2018.01)
  *B60Q 1/00* (2006.01)
  *F21W 107/10* (2018.01)

(52) U.S. Cl.
  CPC ............ *F21S 45/435* (2018.01); *F21S 45/60* (2018.01); *F21W 2107/10* (2018.01)

(56) References Cited

FOREIGN PATENT DOCUMENTS

| | | |
|---|---|---|
| KR | 20160122014 | 10/2016 |
| KR | 20180000550 | 1/2018 |
| KR | 102042488 | 11/2019 |

* cited by examiner

VEHICLE LAMP WITH DEHUMIDIFICATION

CROSS-REFERENCE TO RELATED APPLICATION

This application is based on and claims priority under 35 U.S.C. § 119 to Korean Patent Application Nos. 10-2020-0024536 and 10-2020-0108651, filed on Feb. 27, 2020 and Aug. 27, 2020, in the Korean Intellectual Property Office, the disclosures of which are incorporated by reference herein in their entireties.

BACKGROUND

1. Field

The disclosure relates to a vehicle lamp, and more particularly to a vehicle lamp capable of humidifying inside of the lamp using a thermoelectric element unit.

2. Description of Related Art

In vehicles, various types of lamps such as a headlamp, a rear lamp, a side lamp, and the like are used. In such a vehicle lamp, condensation may occur due to a difference in temperature and humidity of the inside and outside of vehicle lamp. If the condensation appears on a light source and a glass installed in the vehicle lamp, the condensation reduces lighting efficiency of the light source, makes it difficult to ensure visibility, and reduces the life of the light source. Accordingly, a device for effectively removing moisture in the vehicle lamp was required.

SUMMARY

Therefore, in order to solve the problems described above, an object of the disclosure is to provide a vehicle lamp having a function of removing moisture in a housing of the vehicle lamp by driving a thermoelectric element and using a flow path.

According to an aspect of the disclosure, there is provided a vehicle lamp including a light source, a glass disposed in front of the light source, a housing configured to support the light source and the glass and form an appearance, a thermoelectric element unit configured to generate cold wind and hot wind by introducing external air of the housing, a first flow path configured to introduce one of the cold wind and the hot wind generated by the thermoelectric element unit into the housing, and a second flow path configured to discharge the other one of the cold wind and the hot wind to outside of the housing, in which the thermoelectric element unit includes a first part configured to be connected to the first flow path and generate one of cold air and hot air, a second part configured to be connected to the second flow path and generate the other one of the cold air and the hot air, a body configured to partition an arrangement space of the first part and the second part and in which an opening is formed on an upper surface, and a fan configured to be disposed on the opening of the body and introduce the air in a direction from an upper portion to a lower portion, and the thermoelectric element unit is positioned on an upper end of an external rear surface of the housing.

The vehicle lamp according to various embodiments of the disclosure may effectively remove moisture in the vehicle lamp by using the thermoelectric element unit and the flow paths.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "unit" or a "-or/er" in embodiments of the disclosure may perform at least one function or operation, and may be implemented as hardware, software, or a combination of hardware and software. Further, except for when each of a plurality of "units", "-ors/ers", and the like needs to be realized in an individual hardware, the components may be integrated in at least one module and be implemented in at least one processor.

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Hereinafter, the disclosure will be described in more detail with reference to the drawings.

Figure 1:
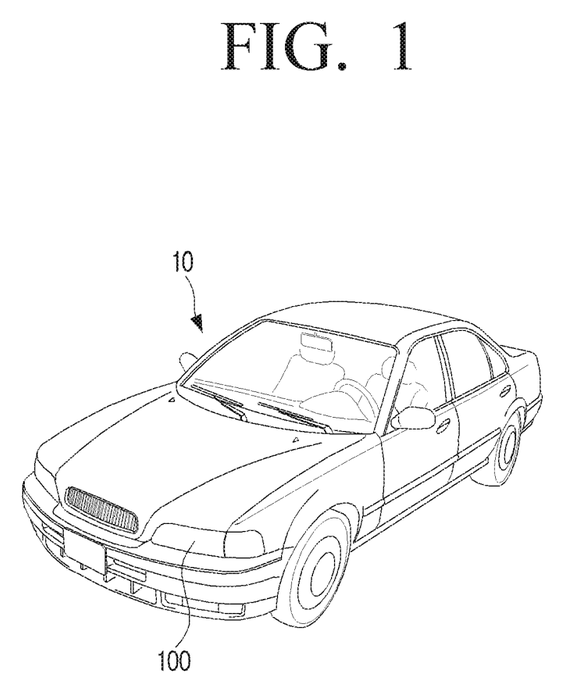
FIG. 1 is a perspective view illustrating a state in which a vehicle lamp is disposed on a front end portion of a vehicle according to an embodiment.

FIG. 1 is a perspective view illustrating a state in which a vehicle lamp 100 is disposed on a front end portion of a vehicle 10 according to an embodiment.

Referring to FIG. 1, the vehicle lamp 100 according to an embodiment of the disclosure may be installed on a front end portion of the vehicle 10. The vehicle includes all vehicles such as a car, a two-wheeled vehicle, a truck, and the like.

In addition, the vehicle lamp 100 according to the disclosure may be disposed, not only as a headlight and a high beam on the front end portion, but also on a rear side of the vehicle 10, and various lighting devices such as a fog lamp, a winker, and the like may be used.

In addition, the vehicle lamp 100 of the disclosure may be used in a range expanded to a train, a ship, and an airplane, and may be applied to illumination equipment, which is not vehicle but is provided with a lamp such as household illumination, industrial illumination, stage illumination, local illumination, and street lamp, and is not limited to the above examples.

However, for convenience of description, an example in which a headlamp is applied to a four-wheeled vehicle will be described in the embodiment.

The vehicle 10 provides a power to the vehicle lamp 100. Specifically, the vehicle 10 may generate an electric energy using a power of an engine and charge a secondary battery with the generated power energy. In addition, the vehicle 10 may provide the power charged in the secondary battery to the vehicle lamp 100. Meanwhile, if the vehicle 10 is driven only with the electric power, the secondary battery may be charged with a power provided from a home adaptor or an electric car charging station.

If manipulation of a user or a preset condition occurs, the vehicle 10 may control the vehicle lamp 100 so that the vehicle lamp 100 emits light. For example, if an external luminance of the vehicle 10 is equal to or less than a preset luminance, the vehicle 10 may control the vehicle lamp 100 so that the vehicle lamp 100 emits light without manipulation of the user. The specific electric configuration of the vehicle 10 will be described with reference to FIG. 2.

The vehicle lamp 100 may emit light to a part ahead of the vehicle 10. Specifically, the vehicle lamp 100 may include a light source 110 for emitting light and may emit light under the control of the vehicle 10.

If an inner temperature or humidity is in a preset state, the vehicle lamp 100 may reduce humidity by using a thermoelectric element unit 130 provided inside thereof. Such a function may be performed according to the control of a central control device mounted on the electric field of the vehicle 10 but may also be autonomously performed by the vehicle lamp 100 without association.

The specific configuration of the vehicle lamp 100 will be described later with reference to FIGS. 3 to 8.

The vehicle 10 of the disclosure described above uses the vehicle lamp 100 capable of adjusting humidity autonomously, and therefore it is possible to extend life of the lamp while improving light distribution performance.

Figure 2:
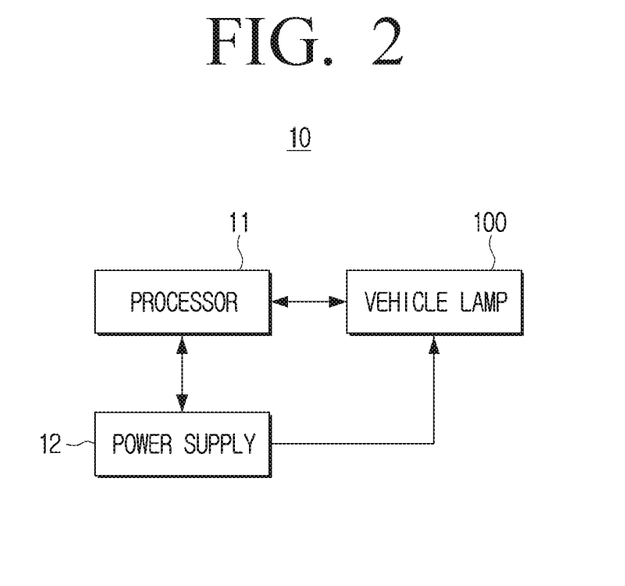
FIG. 2 is a block diagram illustrating an electric configuration of a vehicle.

FIG. 2 is a block diagram illustrating an electric configuration of the vehicle 10.

Referring to FIG. 2, the vehicle 10 may be configured with a processor 11, a power supply 12, and the vehicle lamp 100.

The processor 11 may control each configuration in the vehicle 10. The processor 11 may control an operation of the vehicle lamp 100 according to manipulation of the user and a value detected by various sensors. The processor 11 may check states of various electronic components provided in the vehicle 10 and control the operation. The processor 11 may be referred to as a central control device or a center fascia, but in the specification, it is collectively referred to as the processor 11.

The processor 11 may control the power supply 12 so that the power is supplied to the vehicle lamp 100 selectively according to the operation state of the vehicle 10.

Specifically, if the power of the vehicle 10 is turned off, the processor 11 may control the power supply 12 so that the power is not supplied to the vehicle lamp 100.

If the vehicle is started or in a standby state, the processor 11 may control the power supply 12 so that the power is supplied to the vehicle lamp 100. At that time, the processor 11 may also control the power supply 12 so that the power is supplied only when the operation of the vehicle lamp 100 is needed, although the vehicle is started.

The power supply 12 may supply the power to each configuration in the vehicle 10 using a secondary battery (or battery). Specifically, the power supply 12 may supply the power to the vehicle lamp 100 via a cable (not illustrated). At that time, the cable may not only supply the power but may also transmit a control signal for controlling a power source state of the vehicle lamp 100 to the vehicle lamp 100.

The vehicle lamp 100 may emit light selectively according to the control signal provided from the processor 11 and the power provided from the power supply 12. The vehicle lamp 100 may be referred to as a headlight module, a headlight device, a lamp, a lamp module, and the like.

The vehicle lamp 100 may autonomously perform the operation of adjusting the inner temperature and humidity, without the control of the processor 11. The specific configuration of the vehicle lamp 100 will be described below with reference to FIG. 3.

Meanwhile, hereinabove, it is illustrated and described regarding the simple electric field configuration configuring the vehicle 10, but in the implementation, various configurations may be added to the vehicle 10. For example, a sensor for detecting external luminance, a manipulation unit for selecting the operation of the lamp, and the like may be further included.

Figure 3:
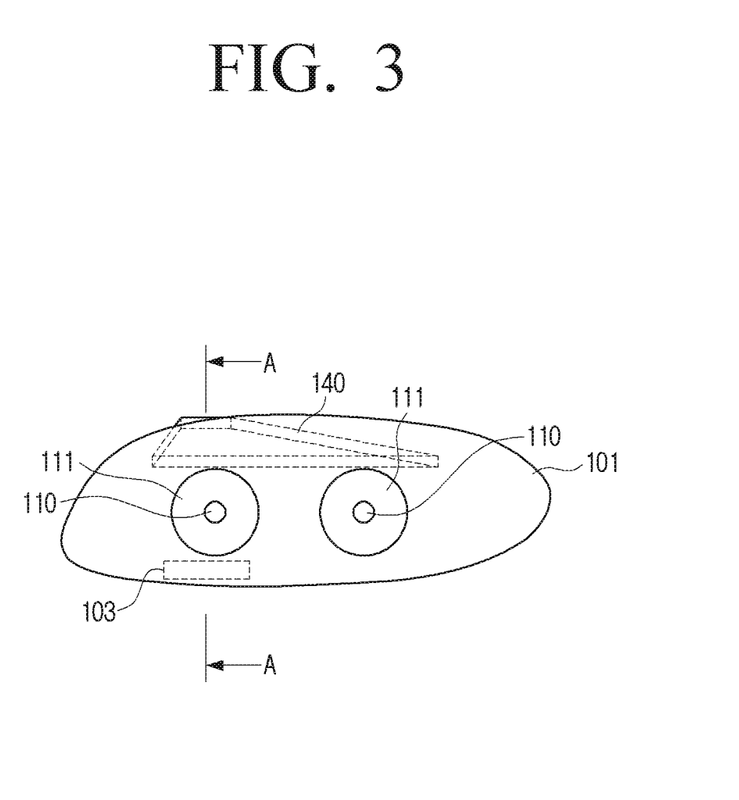
FIG. 3 is a front view of a vehicle lamp according to an embodiment.

FIG. 3 is a front view of the vehicle lamp 100 according to an embodiment.

Referring to FIG. 3, the vehicle lamp 100 may include a light source 110, a housing 101, and a glass 102.

The light source 110 may emit light. Specifically, the light source 110 may be disposed on one surface of the housing 101 configuring the vehicle lamp 100 to emit light according to the manipulation of the user or the control of the processor 11. FIG. 3 illustrates a case of two light sources 110, but the number, the position, the size, and the like of the light sources may be variously changed. For the light source 110, various light emitting components such as an LED lamp, a halogen lamp, an HID lamp, an incandescent lamp, and the like may be used.

The housing 101 may support each configuration in the vehicle lamp 100 and may form an appearance. Specifically, the light source 110 and a reflective layer 111 may be disposed on an inner portion the housing 101, the glass 102 may be disposed on the front surface of the housing 101, a first flow path 140 may be combined via a hole on an upper end of a rear surface of the housing 101, and an air blowing port 103 may be positioned at a lower side. In another embodiment, the first flow path 140 may be combined via a hole on a lower end of the rear surface of the housing 101, and the air blowing port 103 may be positioned at an upper end.

The reflective layer 111 for reflecting the light of the light source 110 may be formed on one surface of the inside of the housing 101. Specifically, the housing 101 may be configured with an insulating material for internal insulation and the reflective layer 111 may be formed on an upper surface of the insulating material, that is, one surface on which the light source 110 is disposed.

The reflective layer 111 may perform a function of reflecting light not emitted in a front direction from among light incident from the light source 110, to the front direction, and may be formed of a material such as aluminum. Meanwhile, in the implementation, a material other than aluminum may be used, as long as it has the reflecting function.

The glass 102 may be disposed in front of at least one light source 110 and cover an opening of a front surface of the housing 101. The light source 110 may emit light in a direction of the glass 102 and the glass 102 may transmit light generated from the light source 110 to the outside.

The glass 102 may play a role of an outer lens with a transparent material so as to transmit light emitted from the light source 110. Meanwhile, in the implementation, the glass 102 may have a specific color according to the type of the vehicle lamp 100.

Figure 4:
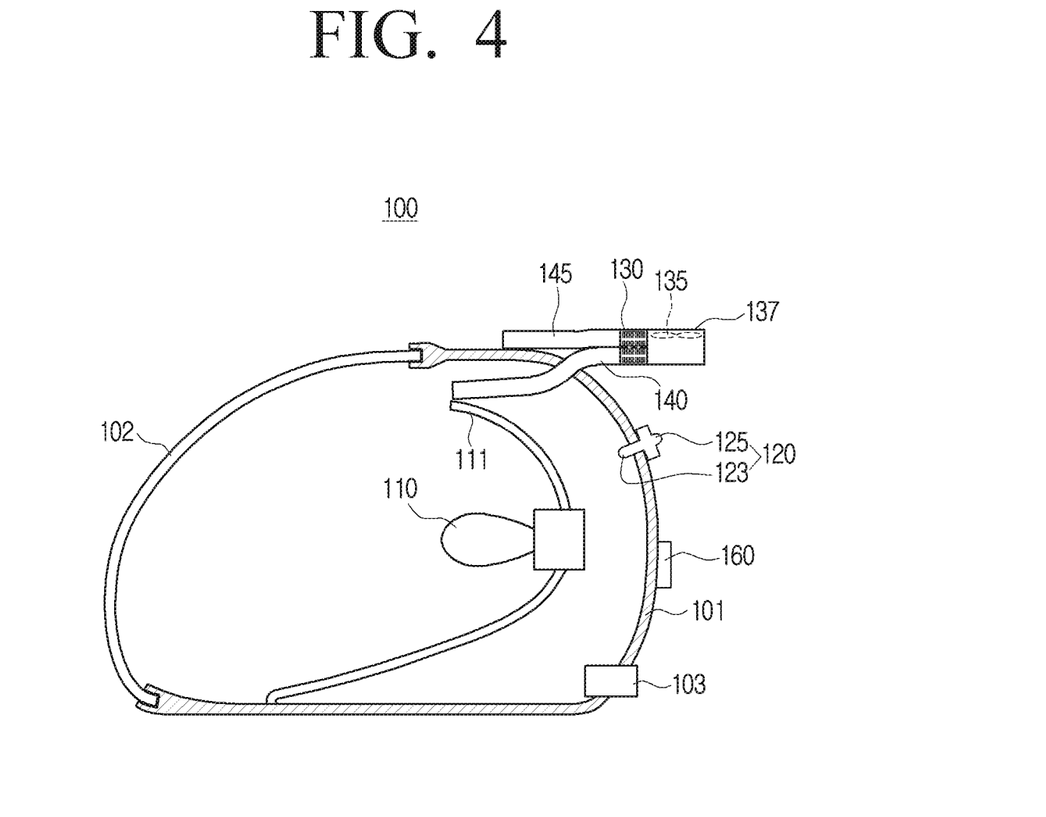
FIG. 4 is a cross-sectional view taken along a line A-A illustrated in FIG. 3 and illustrating a configuration provided in a vehicle lamp.

FIG. 4 is a cross-sectional view taken along a line A-A illustrated in FIG. 3 and illustrating a configuration provided in the vehicle lamp 100.

Referring to FIG. 4, the vehicle lamp 100 may include a thermoelectric element unit 130 and a second flow path 145.

The thermoelectric element unit 130 may be a device for releasing cold air or hot air using a thermoelectric element, and the thermoelectric element may be an element using a Peltier effect which is a phenomenon in which one surface is cooled or heated according to a flow of a current, and thus referred to as a Peltier element.

Since there is no limit in size and shape of the thermoelectric element, the thermoelectric element may have a shape of a hexahedron with horizontal and vertical lengths of 4 cm to 7 cm and a height within 1 cm, and the size and shape thereof may be various according to the size of the vehicle lamp 100 and the inner structure of the vehicle 10. The thermoelectric element may be configured with a semiconductor unit in which a plurality of p-type semiconductors and n-type semiconductors are repeatedly disposed, two ceramic plates disposed to face each other with respect to the semiconductor unit to receive cold air or hot air generated by the semiconductor unit, a plurality of pins provided on each ceramic plate to expand the cold air or hot air, and the like.

A first part 131 may refer to one of the two ceramic plates and the plurality of pins provided on the ceramic plate, and a second part 132 may refer to the ceramic plate and the pins on the opposite side. Accordingly, in the thermoelectric element, when the current flows in a certain direction, the first part 131 may be cooled and the second part 132 may be heated, and when the current flows in a direction opposite thereto, the first part 131 may be heated and the second part 132 may be cooled.

The thermoelectric element unit 130 may be positioned on an upper end of an external rear surface of the housing 101 and may exchange heat with the air introduced from the outside of the housing 101.

If the thermoelectric element unit 130 is positioned in the housing 101, there is a limit in size of the first part 131 and the second part 132 where the heat exchange occurs and the fan 135 where the air flow occurs, but when the thermoelectric element unit 130 is positioned on the external rear surface of the housing 101, a restriction in volume of each component is reduced, thereby improving the heat exchange performance of the thermoelectric element unit 130.

In addition, it is advantageous that, if the thermoelectric element unit 130 needs to be inspected or replaced, the thermoelectric element unit 130 may be inspected and repaired or replaced easily without decomposing the housing 101, since the thermoelectric element unit 130 is positioned on the external rear surface of the housing 101.

Therefore, by positioning the thermoelectric element unit 130 on the external rear surface of the housing 101, a temperature control performance of the inside of the housing 101 may be improved and the repairing and inspection may be easily performed, compared to the embodiment in which the thermoelectric element unit 130 is positioned in the housing 101.

The thermoelectric element unit 130 may be configured with the first part 131 which generates one of cold air or hot air, when an electric signal is applied, and the second part 132 which is disposed on an upper side of the first part 131 with respect to the position of the housing 101 and generates the other one of the cold air and the hot air, when the electric signal is applied.

A body 137 may divide a space where the first part 131 and the second part 132 are disposed, and an opening may be formed on an upper surface thereof. The first part 131 and the second part 132 may be disposed in a vertical direction by the body 137 and the second part 132 may be disposed on an upper portion of the first part 131.

The body 137 may support the first part 131, the second part 132, and the fan 135 and guide the air introduced from the opening by the fan 135 in a direction of the first part 131 and the second part 132.

The fan 135 may be disposed on the opening of the body 137, and preferably disposed in parallel to a bottom surface of the body 137 to introduce the air from the outside of the housing 101. When the fan 135 is driven, the fan 135 may introduce the external air of the housing 101 into the thermoelectric element unit 130, and the introduced air may pass through the first part 131 or the second part 132 for heat exchange and may be changed to one of cold wind or hot wind.

There is no limit in type and shape of the fan 135, but at least the fan should generate an air flow in one direction. Fans with various types and shapes such as a high-speed fan, a silent fan, a small-sized fan, and the like may be used according to the industrial field in which the vehicle lamp 100 according to the disclosure is applied.

Referring to FIG. 3, the thermoelectric element unit 130 may include the first flow path 140 and the second flow path 145. The flow path may be added in order to effectively transfer the cold wind and the hot wind.

The first flow path 140 may be connected to the first part 131 of the thermoelectric element unit 130 and the second flow path 145 may be connected to the second part 132. Accordingly, the first flow path 140 may introduce one of the cold wind and the hot wind generated from the first part 131 into the housing 101 and the second flow path 145 may discharge the other one of the cold wind and the hot wind to the outside of the housing 101.

The configurations and shapes of the first flow path 140, the second flow path 145, and the fan 135 will be described later in detail with reference to FIGS. 6 and 7.

The air blowing port 103 may be disposed on a bottom surface, a side surface, an upper end of a rear surface, or a lower end of the rear surface of the housing 101. The air blowing port 103 may be an opening for discharging the air introduced into the housing 101 to the outside of the housing 101, and may induce the air in a direction preset as a discharge direction according to the shape and the position of the air blowing port 103.

The air introduced to the inside via the first flow path 140 may decrease or increase the temperature while circulating inside of the housing 101, and may be discharged to the outside of the housing 101 via the air blowing port 103 disposed on a lower end thereof.

A separate air blowing port fan (not illustrated) may be disposed on the air blowing port 103. The air blowing port fan may control an air exhaust direction and an air exhaust speed of the air blowing port 103 according to the air exhaust direction and air volume.

An embodiment of the driving of the vehicle lamp 100 will be described. If the temperature in the housing 101 increases due to the heat generated from the light source 110, the humidity may increase and condensation may occur. In this case, the vehicle lamp 100 may be driven and the cold wind may flow into the housing 101 via the first flow path 140. The cooled air having a comparatively high density may go down and cause the heat exchange with the internal air, thereby adjusting the temperature in the housing 101. In addition, the air obtained by completing the heat exchange may be discharged to the outside via the air blowing port 103 formed on the lower portion.

Since the air blowing port 103 is disposed on the lower end, the air subjected to the heat exchange may be discharged from the lower portion of the housing 101, and the air in the housing 101 which is pushed by the air introduced from the upper portion may be directly discharged to the outside.

The opening of the air blowing port 103 may be smaller than the opening of the first flow path 140. A flow velocity of the air discharged via the air blowing port 103 increases as the opening of the air blowing port 103 is narrowed, and it may be effective to prevent the introduction of the air of the outside of the housing 101 via the air blowing port 103.

A sensor 120 may include an internal sensing unit 123 for detecting at least one of a temperature and humidity in the housing 101.

Specifically, the internal sensing unit 123 may include at least one of a humidity sensor for measuring humidity of the inside of the vehicle lamp 100 and a temperature sensor for detecting a temperature inside of the vehicle lamp 100, or may be a temperature-humidity sensor for detecting the temperature and the humidity at the same time.

The sensor 120 may be disposed on the external rear surface of the housing 101 and the internal sensing unit 123 may sense the temperature or the humidity inside of the housing 101 via a hole formed on the rear surface of the housing 101.

A controller 160 may selectively introduce one of the cold wind and hot wind into the vehicle lamp 100 by converting polarity of an electric signal provided to the thermoelectric element unit 130 based on a detection result of the sensor 120.

The controller 160 may be disposed on the external rear surface of the housing 101 or inside of the housing 101 to control the operation of the thermoelectric element unit 130 based on a sensing value detected by the sensor 120. The specific operation of the controller 160 will be described later in detail with reference to FIG. 8.

The sensor 120 may further include an external sensing unit 125 for obtaining at least one of the humidity and the temperature of the outside of the housing 101.

Since the sensor 120 may be disposed on the external rear surface of the housing 101, the external sensing unit 125 may sense the temperature or the humidity of the external rear surface of the housing 101 and provide the obtained result to the controller 160.

In addition, the external sensing unit 125 may be disposed to be exposed to the outside of the vehicle 10 in order to measure the temperature and the humidity of the outside of the vehicle 10. A main reason for occurrence of the moisture and the condensation in the vehicle lamp 100 may be a difference in temperatures of the outside of the vehicle 10 and the inside of the housing 101 with respect to the glass 102. Therefore, if the external sensing unit 125 may be disposed in the vehicle lamp 100 or disposed in the vehicle 10, it may be difficult to accurately detect the difference in temperature and humidity, and accordingly, the external sensing unit 125 may be positioned outside of the vehicle 10.

In an embodiment not including the external sensing unit 125, an external temperature or humidity information may be received from the processor 11 of the vehicle 10. The controller 160 may control the operation of the thermoelectric element unit 130 by comparing the information received form the processor 11 and the result detected from an internal sensor.

The controller 160 may control the operation of the thermoelectric element unit 130 by comparing the detection result of the internal sensing unit 123 and the obtained result of the external sensing unit 125. The operation of the vehicle lamp 100 by the controller 160 will be described later in detail with reference to FIG. 8.

Meanwhile, in describing FIGS. 3 and 4, the simple configuration configuring the vehicle lamp 100 is illustrated and described, but in the implementation, the vehicle lamp 100 may further include various other configurations.

For example, the lamp capable of changing a light emission direction of the light source 110 may further include a driving member (not illustrated) for changing the light emission direction, may further include a shield (not illustrated) for deriving light scattered from the light source 110 to the reflective layer 111, and may further include a bezel (not illustrated) surrounding the reflective layer 111.

Figure 5:
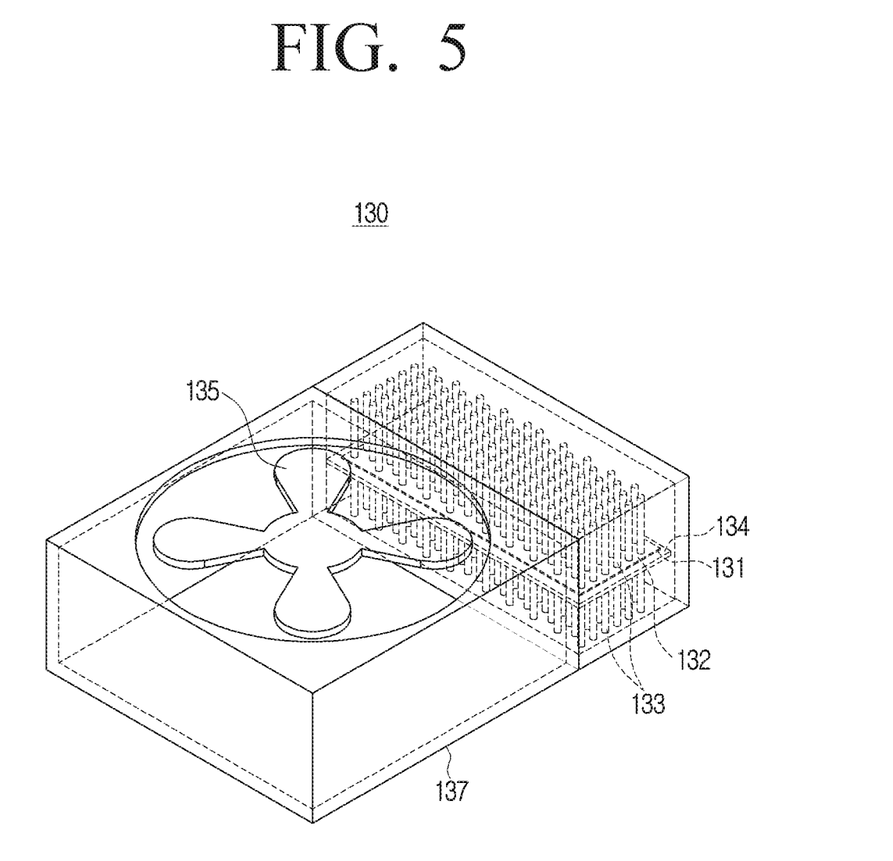
FIG. 5 is a diagram illustrating a thermoelectric element unit according to an embodiment.

FIG. 5 is a diagram illustrating the thermoelectric element unit 130 according to an embodiment.

Referring to FIG. 5, the thermoelectric element unit 130 may be configured with the first part 131, the second part 132, the fan 135, and the body 137 described above.

The fan 135 may be disposed in parallel to the bottom surface of the body 137 to introduce the air from the upper direction, and there may be no limit in thickness of the thermoelectric element unit 130 in a vertical direction.

Specifically, if the fan 135 is disposed vertically from the bottom surface of the body 137, the fan 135 may have only a size within a range of the vertical height of the body 137. However, since the fan 135 of the disclosure is disposed in parallel to the bottom surface of the body 137 and the body 137 has a structure of guiding the introduced air to the first part 131 and the second part 132, the fan 135 may have a comparatively larger size, by considering the size of the bottom surface of the body 137.

The thermoelectric element unit 130 may further include a plurality of pins 133 coming into contact with the first part 131 and the second part 132.

The pins 133 may increase the heat exchange efficiency by increasing the surface area coming into contact with the air at the time of the heat exchange between the air and the thermoelectric element. Accordingly, the pins 133 may be formed of a material with high thermal conductivity.

The pins 133 illustrated in FIG. 5 may be disposed on both the upper ceramic plate and the lower ceramic plate to configure the first part 131 and the second part 132. The air introduced to the direction of the first part 131 and the second part 132 may pass the pins to be heated or cooled.

The shape of the pin 133 may be a cylindrical shape or a pole shape, a shape of one or more boards parallel to an air proceeding direction, and may have various shapes for increasing the surface area by passing the air. In addition, the pin may be referred to as a heat radiation member.

Since the first part 131 and the second part 132 are cooled or heated, the thermoelectric element unit 130 may have a difference in temperature between the first part 131 and the second part 132. For energy efficiency, it is advantageous that the cold wind or hot wind generated from the first part 131 is discharged into the housing 101 while maintaining the cooled or heated state.

Accordingly, in order to minimize unnecessary heat exchange in the thermoelectric element unit 130, the thermoelectric element unit 130 may further include an insulation material 134 disposed on a side surface of the first part 131 and the second part 132.

The insulation material 134 may be formed of a material having low thermal conductivity. In addition, although not illustrated in the drawing, the insulation material 134 may be disposed to extend to between the first flow path 140 and the second flow path 145.

The body 137 may support the configuration of the thermoelectric element unit 130 and transfer the introduced air as described above.

Specifically, if the first part 131 of FIG. 5 is assumed as the lower portion and the second part 132 is assumed as the upper portion, the fan 135 may transfer the air outside of the housing 101 to the lower direction orthogonal to the first part 131 and the second part 132. In addition, the body 137 may divide the air transferred to the lower direction to flow to the first part 131 and the second part 132, thereby deriving in a horizontal direction.

If the body 137 is not included and the fan 135 is disposed directly on the side surface of the thermoelectric element, the volume of the thermoelectric element unit may increase.

Specifically, in order to introduce the air smoothly into the thermoelectric element unit 130, it is necessary to ensure the size of the fan 135 to a constant level or higher. However, there is a problem that, as the size of the fan 135 increases, the opening of the thermoelectric element unit 130 increases, and the volume of the entire thermoelectric element unit 130 may increase.

Accordingly, in order to dispose a configuration for playing a role of the thermoelectric element unit 130 of the disclosure, it was necessary to reduce the size of the fan or provide a separate space on the rear surface or the side surface of the vehicle 10.

However, the thermoelectric element unit 130 of the disclosure may be disposed on the upper portion of the housing 101 and derive the direction for introducing the air by the fan 135 from the upper portion to the lower portion by the body 137.

Therefore, in the vehicle lamp 100 according to the disclosure, if the horizontal length of the thermoelectric element unit 130 increases, the sufficient size of the fan 135 may be ensured. In addition, the plurality of fans 135 may be connected in parallel to the side surface of the thermoelectric element unit 130.

Therefore, it is advantageous that the thermoelectric element unit 130 of the disclosure is combined with the upper portion of the housing 101 to minimize the vertical height.

Therefore, in the disclosure, it is possible to minimize the ensuring the inner space of the vehicle 10 and apply various types of the vehicle lamp 100 to the housing 101, thereby ensuring compatibility.

Meanwhile, in illustrating and describing FIG. 5, it is illustrated and described that one thermoelectric element is disposed in the vehicle lamp 100, but in the implementation, a plurality of thermoelectric elements may be used.

Figure 6:
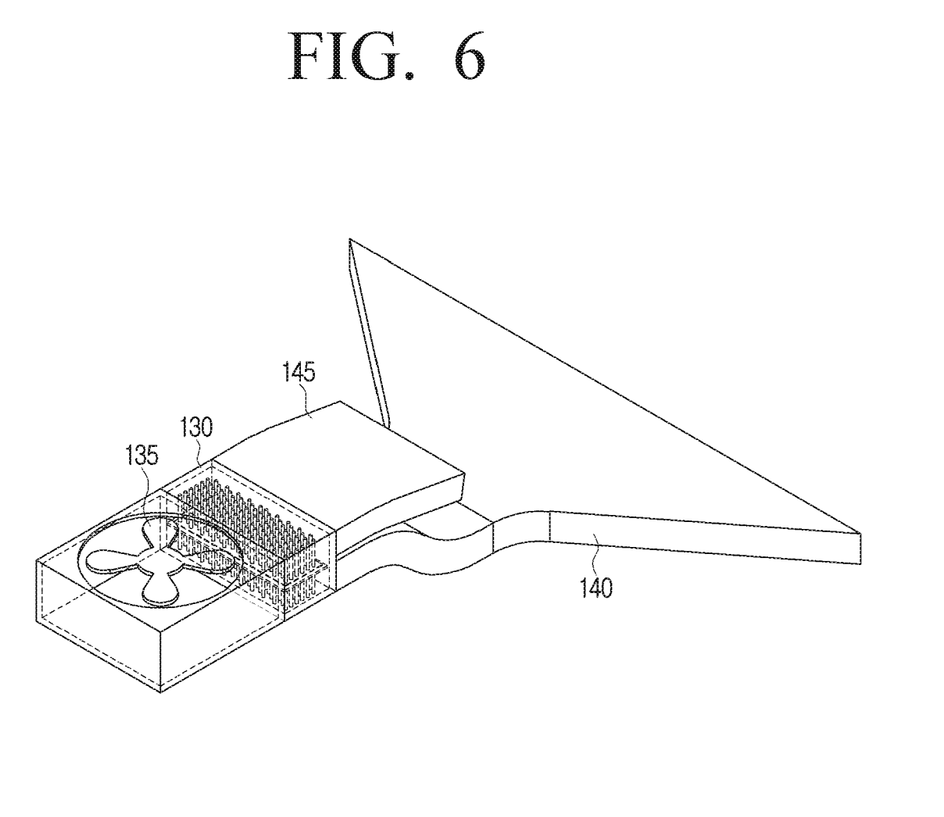
FIG. 6 is a diagram illustrating a combination between a thermoelectric element unit and a first flow path and a second flow path according to an embodiment.
Figure 7:
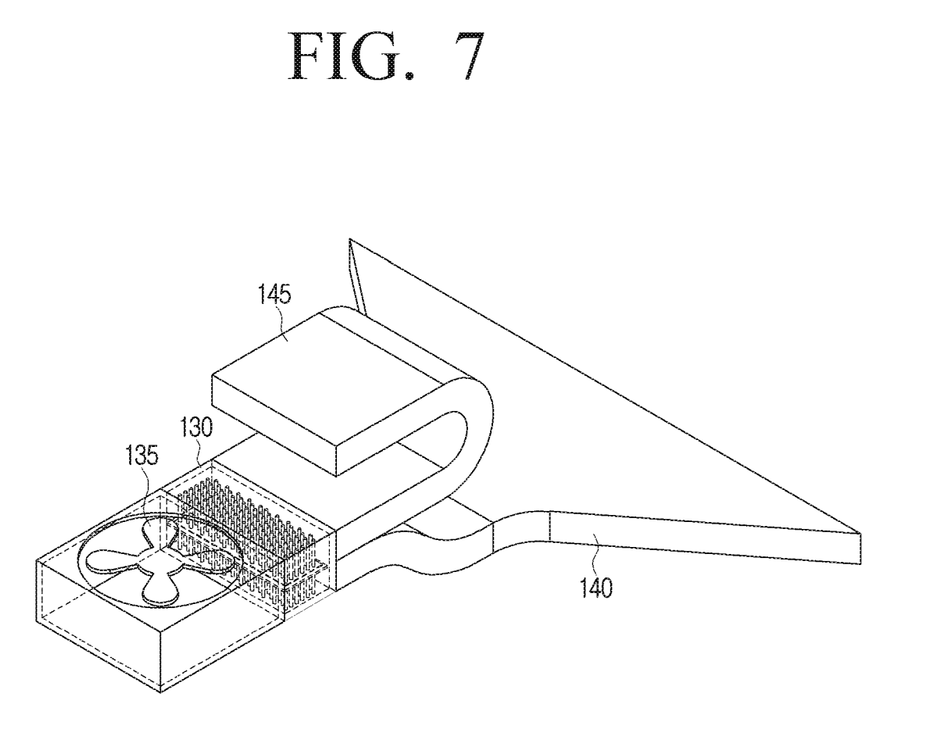
FIG. 7 is a diagram illustrating a combination between a thermoelectric element unit and a first flow path and a second flow path according to an embodiment.

FIGS. 6 and 7 are diagrams illustrating a combination between the thermoelectric element unit 130 and the first flow path 140 and the second flow path 145 according to an embodiment.

In regard to the first flow path 140, referring to FIGS. 6 and 7, the first flow path 140 may have a shape having a cross-sectional area increasing in a direction of the glass 102 so that one of the cold wind and the hot wind circulates by convention in the housing 101 along an inner side surface of the glass 102.

As the first flow path 140 has the cross-sectional area increasing in the direction of the glass 102, the cold wind or hot wind of the first part 131 may be transferred to the entire area of the inside of the vehicle lamp 100, and the temperature of the entire area of the inside of the housing 101 may be evenly adjusted.

Throughout this process, it is possible to prevent reverse current due to the temperature difference in the housing 101 and to effectively derive the air flow to evenly adjust the temperature and humidity therein.

As illustrated in FIG. 6, if the trumpet-shaped first flow path 140 is produced, the hot wind or cold wind may be transferred to the widest area as possible of the glass 102. According to various embodiments of the disclosure, it may be produced with an outlet having an open part and a closed part, so that the hot wind or the cold wind is transferred in priority to a part of the glass 102 on which the condensation easily appears, without fully opening the outlet of the first flow path 140. Alternatively, the outlet may be produced to not be opened but closed, and a plurality of holes may be punched so that the hot wind or the cold wind may flow to the side of the glass 102 via the holes. As described above, if the area of the outlet is reduced, stronger wind may be transferred to the glass 102 without increasing the driving power of the fan 135.

Regarding the second flow path 145, referring to FIG. 6, the second flow path 145 may be formed to discharge the other one of the cold wind and the hot wind to an external direction of the glass 102. The external direction of the glass 102 may be an external direction of the vehicle 10 and such a structure may discharge the cooled or heated air directly to the outside of the vehicle 10. If the second flow path 145 is formed as illustrated in FIG. 6, the wind with different characteristics from the wind discharged from the first flow path 140 may be transferred to the outside of the glass. If the hot wind is output from the first flow path 140 into the glass and the cold wind is output from the second flow path 145 to the outside of the glass, the temperature difference between the inside and the outside of the glass may be more quickly resolved. In addition, it is possible to prevent the hot wind or the cold wind from being transferring directly to other components disposed on a rear or upper side of the vehicle lamp 100, a hood, and the like.

Meanwhile, according to another embodiment of the disclosure, the second flow path 145 may be formed to face a rear direction of the vehicle lamp 100, that is, a rear surface direction of the housing 101, as illustrated in FIG. 7.

Since the second flow path 145 discharges the cold wind or the hot wind in a direction opposite to the direction of the first flow path 140, the proceeding directions of the first flow path 140 and the second flow path 145 may be set differently to minimize unnecessary secondary heat exchange between the first flow path 140 and the second flow path 145.

In addition, if the second flow path 145 is disposed as illustrated in FIG. 7, the second flow path may have a function of adjusting the temperature of the rear portion of the vehicle lamp 100.

As described above, the vehicle lamp 100 according to the disclosure may be separated from the processor 11 of the vehicle 10 and receive the power from the power supply 12 to be driven independently. Therefore, it is possible to transfer the cold wind or the hot wind to the rear surface of the vehicle lamp 100 so as to meet the needs of the function of the vehicle 10 according to the arrangement position.

Figure 8:
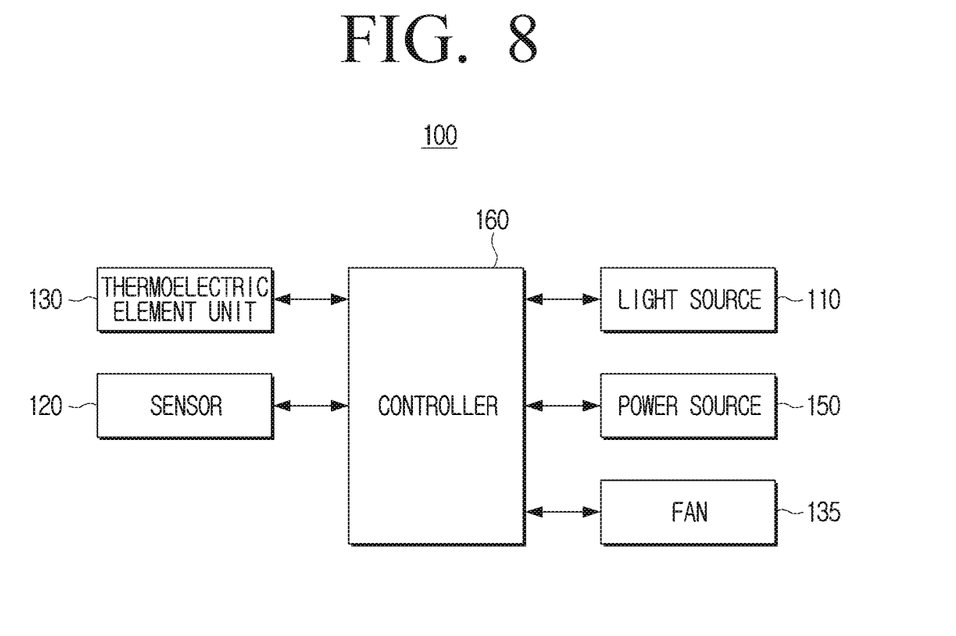
FIG. 8 is a block diagram illustrating a configuration of a vehicle lamp according to an embodiment.

FIG. 8 is a block diagram illustrating a configuration of the vehicle lamp 100 according to an embodiment.

Referring to FIG. 8, the controller 160 may be connected directly to a power source 150.

The power source 150 may provide the power provided from the power supply 12 of the vehicle 10 to each element in the vehicle lamp 100.

The controller 160 may provide the power of the power source 150 to the light source 110. At that time, the controller 160 may selectively provide the power to the light source 110 based on the control signal provided form the processor 11.

The controller 160 may independently control and adjust the power of the thermoelectric element unit 130 based on a value measured by the sensor 120.

For example, if a humidity value detected by the sensor 120 is a preset value or higher, the controller 160 may provide the power of the power source 150 to the thermoelectric element unit 130 so that the thermoelectric element unit 130 is operated.

The controller 160 may control the power source 150 so that the power is supplied to the thermoelectric element unit 130 with power supply duty corresponding to the detected humidity value. For example, the power source 150 may provide power with duty of 30% to the thermoelectric element unit 130, if the humidity value is 50% to 60%, provide power with duty of 50% to the thermoelectric element unit 130, if the humidity value is 60% to 70%, and provide power with duty of 100% (in other words, continuously supply power) to the thermoelectric element unit 130, if the humidity value is 70% or more.

The above numerical values are merely examples and the value may be variously applied depending on a volume of the thermoelectric element, a wind volume of the fan 135, a size of the inner space of the vehicle lamp 100, and the like.

Specifically, if the temperature of the inside of the housing 101 of the vehicle lamp 100 is increased due to the light source 110 and the humidity thereof is increased, the moisture should be removed by decreasing the temperature in the vehicle lamp 100 by the controller 160.

If the humidity range is within a preset range in which the humidity needs to be reduced, the power with preset size and polarity may be provided to the thermoelectric element unit 130 to cool the first part 131 and drive the fan 135. The air cooled in the first part 131 may be transferred into the housing 101 via the first flow path 140, thereby decreasing the temperature in the vehicle lamp 100. The internal air with high humidity may be discharged to the outside of the housing 101 via the air blowing port 103, thereby adjusting the humidity.

Meanwhile, in the winter, it may be difficult to remove the moisture by the cooling method. In such a case, the controller 160 may increase the temperature in the vehicle lamp 100 based on values of temperature and humidity measured by the external sensing unit 125.

Specifically, the controller 160 may heat the first part 131 of the thermoelectric element unit 130 and drive the fan 135. If the above operation is used, the relative humidity in the vehicle lamp 100 is increased and the air with high humidity may be discharged to outside via the air blowing port 103, thereby preventing dew from being formed on the glass 102 of the vehicle lamp 100. After confirming that the internal air with high humidity is discharged by the sensor 120, the controller 160 may control the power of the thermoelectric element unit 130 again to adjust the temperature and the humidity.

In other words, in the disclosure, the thermoelectric element may be automatically operated by the controller 160 according to a measurement value transferred from the sensor 120 to remove the moisture in the vehicle lamp 100 and prevent the condensation. Therefore, it is possible to improve the light distribution performance of the vehicle lamp 100.

The controller 160 may be implemented as a switching element for supplying the power of elements such as an integrated circuit, an MPU, an ASIC, and a processor 11 and the thermoelectric element unit 130. In addition, a control system of the thermoelectric element unit 130 of the controller 160 may be a pulse width modulation (PWM) method.

Depending on the temperature and humidity conditions, one of the cold wind and the hot wind may be more efficient to remove moisture. In the manufacturer of the vehicle lamp 100, driving conditions in which the moisture is removed in each temperature and humidity condition most rapidly may be determined through repeated experiments while variously changing the internal temperature and humidity and external temperature and humidity of the vehicle lamp. If a memory is provided in the vehicle lamp 100, the memory may store temperature and humidity conditions and the driving conditions matched to each other.

The controller 160 may determine the current temperature and humidity conditions by comparing the detection results of the internal sensing unit 123 and the external sensing unit 125 of the sensor 120, read out the driving condition matched with the above condition from the memory, and drive the thermoelectric element unit 130 according to the condition. Therefore, it is possible to remove the moisture rapidly and efficiently.

Meanwhile, it is described above that the controller 160 performs both the control function and the power supply function of the thermoelectric element unit 130, but both functions may be separately performed by a plurality of elements. In other words, the control function may be performed by a separate integrated circuit and the power supply function may be performed by a plurality of switching elements. At that time, the plurality of switching elements may configure an H-bridge circuit.

As described above, the vehicle lamp 100 according to the disclosure may adjust the humidity in the vehicle lamp 100 by itself, thereby reducing resources of the system of the vehicle 10.

Meanwhile, in illustrating and describing FIG. 8, it is illustrated and described that the controller 160 controls the light source 110, but in the implementation, the light source 110 may be controlled directly by the processor 11 and the controller 160 may not control the light source 110. In other words, the controller 160 may control only the humidity in the vehicle lamp 100, without the control of the processor 11.

Meanwhile, in illustrating and describing FIG. 8, it is described that the controller 160 controls the operation of the thermoelectric element unit 130 only according to the detected temperature and humidity, but in the implementation, the controller 160 may control the operation of the thermoelectric element unit 130 by considering whether the light source 110 is operated.

Figure 9:
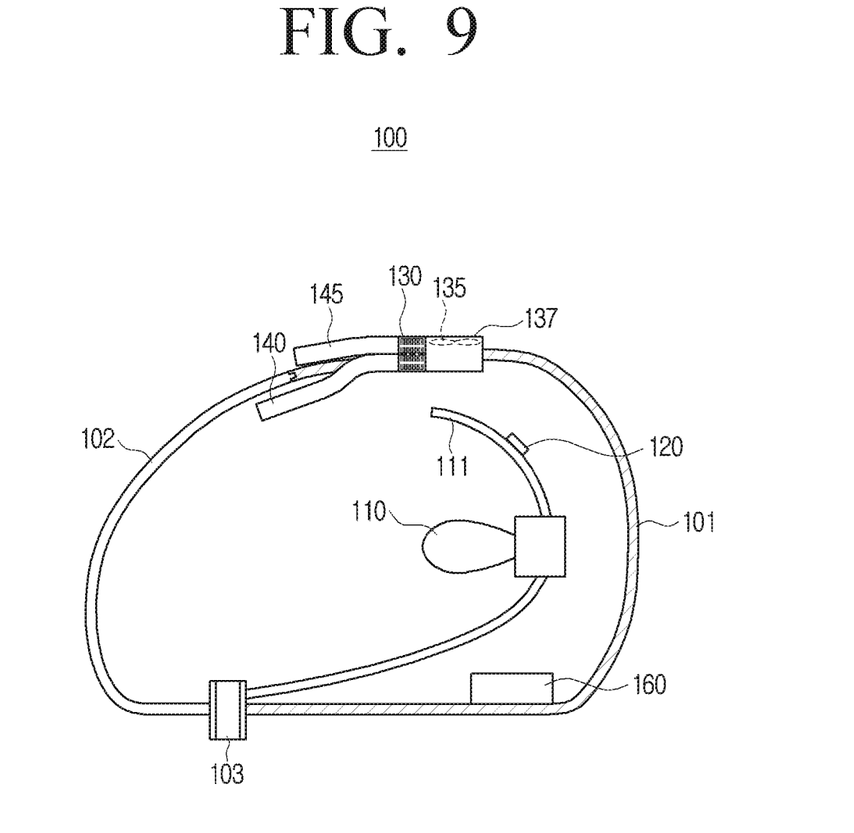
FIG. 9 is a diagram illustrating a thermoelectric element unit according to an embodiment.

FIG. 9 is a diagram illustrating the thermoelectric element unit 130 according to an embodiment.

Referring to FIG. 9, the thermoelectric element unit 130 may be disposed on a hole of an upper side of the housing 101 and the sensor 120 may be disposed on a rear side of the light source 110 in the housing 101.

The vehicle lamp 100 is disposed on an edge part such as a front, side, and rear portion of the vehicle due to its characteristics, and accordingly, a large amount of other components are mounted on the rear side of the vehicle lamp 100. Thus, there is no sufficient space to add new components, and in order to ensure the space, not only the structure of the vehicle lamp 100, but also a component layout of the vehicle itself has to be changed. However, if the thermoelectric element unit 130 is disposed on the upper side of the vehicle lamp 100 as illustrated in FIG. 9, the thermoelectric element unit 130 may be disposed and only the flow path part may be added by punching the hole on the upper side of the housing 101 of the vehicle lamp 100, and accordingly, the shapes or arrangement structures of other components may not be changed, which significantly increases compatibility.

The sensor 120 may be disposed on a part of the rear side of the light source 110 in the housing 101. Specifically, the sensor 120 may be disposed on the rear surface of the reflective layer 111. If the sensor 120 is positioned in front of the light source 110, it may be difficult to accurately detect the temperature and humidity of the inside of the vehicle lamp 100 due to the heat radiated from the light source 110 when driving the vehicle lamp 100, and therefore the sensor is preferably positioned on the rear portion of the light source.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A vehicle lamp comprising:
a light source;
a glass disposed in front of the light source;
a housing configured to support the light source and the glass and form an appearance, wherein the housing includes an external rear surface having an upper end and a lower end;
a thermoelectric element unit configured to generate cold wind and hot wind by introducing external air of the housing;
a first flow path configured to introduce one of the cold wind and the hot wind generated by the thermoelectric element unit into the housing; and
a second flow path configured to discharge the other one of the cold wind and the hot wind to outside of the housing,
wherein the thermoelectric element unit comprises:
a first part configured to be connected to the first flow path and generate one of cold air and hot air;
a second part configured to be connected to the second flow path and generate the other one of the cold air and the hot air;
a body including an upper surface and a bottom surface facing each other and accommodating the first part and the second part between the upper surface and the bottom surface, wherein the body has an opening formed on the upper surface; and
a fan configured to be disposed on the opening of the body and introduce the air in a direction from the upper surface to the bottom surface of the body, and
wherein the thermoelectric element unit is positioned on the upper end of the external rear surface of the housing.

2. The vehicle lamp according to claim 1, wherein the second part is disposed on an upper portion of the first part,
wherein the fan is configured to be disposed in parallel to the bottom surface of the body, and
wherein the body is configured to guide the air introduced from the opening to the first part and the second part.

3. The vehicle lamp according to claim 1, further comprising an air blowing port configured to be disposed on the lower end of a the external rear surface of the housing.

4. The vehicle lamp according to claim 1, further comprising:
a sensor comprising an internal sensing unit configured to detect at least one of a temperature and a humidity in the housing; and
a controller configured to control polarity of an electric signal provided to the thermoelectric element unit based on a detection result of the sensor.

5. The vehicle lamp according to claim 4, wherein the sensor comprises an external sensing unit configured to obtain at least one of a humidity and a temperature of outside of the housing, and
wherein the controller is configured to control an operation of the thermoelectric element unit by comparing a detection result of the internal sensing unit and an obtained result of the external sensing unit.

6. The vehicle lamp according to claim 5, wherein the sensor is configured to be positioned on the external rear surface of the housing.

7. The vehicle lamp according to claim 4, wherein the controller is configured to receive at least one information of an external temperature and an external humidity from a processor of a vehicle on which the vehicle lamp is mounted, and control an operation of the thermoelectric element unit by comparing the detection result of the sensor.

8. The vehicle lamp according to claim 1, wherein the first flow path has a shape of a cross-sectional area widening in a direction of the glass so that one of the cold wind and the hot wind circulates by convection in the housing along an inner side surface of the glass.

9. The vehicle lamp according to claim 8, wherein the second flow path is configured to discharge the other one of the cold wind and the hot wind to an outside direction of the glass.

10. The vehicle lamp according to claim 8, wherein the second flow path is configured to discharge the other one of the cold wind and the hot wind to a rear surface direction of the housing.

11. The vehicle lamp according to claim 1, wherein the thermoelectric element unit comprises a plurality of pins coming into contact with the first part and the second part.

12. The vehicle lamp according to claim 1, wherein the thermoelectric element unit comprises an insulation material disposed on side surfaces of the first part and the second part.

* * * * *